FLOW SHEET for the

Manufacture of Pure Cupric Oxychloride

Contaminated copper salt solution:
cement copper added

↓

Precipitate of cuprous chloride
and cement copper:
treated with alkali metal
chloride solution

↓

Cuprous chloride solution
treated with oxygen
containing gas

↓

Precipitate of contaminations
and of cement copper:
precipitate separated and
solution treated with
oxygen containing gas

↓

Precipitate of pure cupric oxychloride

Ernst Kuss
Kurt Horalek
Oskar Emert
INVENTORS

Patented June 13, 1939

2,162,091

UNITED STATES PATENT OFFICE 2,162,091

MANUFACTURE OF CUPRIC OXYCHLORIDE

Ernst Kuss, Kurt Horalek, and Oskar Emert, Duisburg, Germany, assignors of one-half to Duisburger Kupferhütte, Duisburg, Germany, and one-half to I. G. Farbenindustrie Aktiengesellschaft, Frankfort-on-the-Main, Germany Application November 4, 1937, Serial No. 172,776
In Germany March 14, 1934

4 Claims. (Cl. 23—85)

This invention relates to the manufacture of pure cupric oxychloride.

It is known to manufacture cupric oxychloride from metallic copper and cuprous chloride by oxidation. According to the known cupric oxychloride processes a pure cupric oxychloride is only obtained when starting from solutions which besides copper do not contain any other constituents, in particular no iron and arsenic.

In accordance with the present invention it is possible to obtain pure cupric oxychloride from solutions which, for instance are contaminated by Fe, Pb, As, Ag and the like, by separating the copper as cuprous chloride together with excess cement copper, introducing this cuprous chloride-cement copper mixture after separation from the mother lye into an alkali metal chloride solution, oxidizing partially until the iron is precipitated in the form of ferric hydroxide, which ferric hydroxide contains the arsenic absorbed thereto, treating the filtered solution with oxygen or oxygen containing gases and washing out the separated cupric oxychloride, if necessary.

Pure cupric oxychloride is, however, suitable, if it is technically accessible, to form a new basis for the manufacture of all copper salts. Hitherto exclusively copper sulfate was the basis for the copper salts. Several working stages are necessary to manufacture pure copper sulfate from technical lyes.

It is a feature of the present invention to manufacture pure cupric oxychloride from impure copper or copper compounds or technical lyes in a simple process. The copper contained in the technical lyes is in most cases present in the form of copper sulfate and/or copper chloride, thus, for instance in the lyes of the chlorinated roasting as cuprous chloride, cupric chloride and copper sulfate. These lyes contain contaminations such as iron, arsenic, lead, silver, zinc, cobalt, manganese and others.

The process according to the invention with regard to the treatment of a lye as specified is effected by first converting the copper chloride into cuprous chloride by introducing cement copper into the solution while stirring. The cuprous chloride-cement copper mixture is separated from the lye by decantation and filtration, treated with a sodium chloride or another alkali metal chloride solution and the solution is stirred while simultaneously blowing in air. As soon as the solution has been freed from iron and arsenic it is separated from the residue and oxidized with air. In this manner a very pure oxychloride is obtained. The cupric chloride forming during the process which remains dissolved in the remaining lye containing common salt is preferably reintroduced into the cuprous chloride-cement copper mixture. Thereby it is reduced to cuprous chloride which is simultaneously dissolved with the cuprous chloride of the starting material. It is advantageous to remove the circulating solution after it has been used several times in order to avoid too strong a concentration of foreign metals, in particular of zinc and cobalt. Under these working conditions practically all arsenic and iron is precipitated in the form of ferric hydroxide containing the arsenic adsorbed thereto in the dissolving process prior to oxychloride precipitation occurring. In the case of a high arsenic content it may be advantageous to add iron salts. If lead is present it is advantageous to treat the cuprous chloride-cement copper mixture with a sodium sulfate-sodium chloride solution; under these conditions the lead is retained as lead sulfate in the starting material.

In many cases the technical lyes do not contain chlorine ions as the lyes obtained in the artificial silk production and the arsenic-containing lyes of the copper electrolysis. In this case the process is carried out so that an amount of about one third of the lyes is treated with such a quantity of common salt that the proportion of copper ions to chlorine ions is 1:2. The copper of the remaining lyes is separated directly or indirectly as cement copper and added to the copper solution containing common salt. Cuprous chloride separates which together with the excess of cement copper serves as the starting material for the manufacture of cupric oxychloride. This is effected by adding sodium chloride solutions to the cement copper chloride mixture, separating the cuprous chloride solution from the residue and oxidizing with air. Otherwise the process can be carried out as in the case of the working up of solutions of the chlorinated roasting whereby for removing a large amount of arsenic, iron salt solutions are added before the partial oxidation. It is also possible to work up the cupric chloride solution obtained after separation of the cupric oxychloride by precipitation with bases to cupric oxychloride. It may also be advantageous to precipitate the cupric chloride with bases prior to the separation of the cupric oxychloride. Furthermore, the cupric chloride of the residual solution may be worked up to other copper compounds.

The above described process is illustrated in the flow sheet constituting the single figure of the drawing.

The invention is further illustrated by the following examples without being restricted thereto:

Example 1

Impure cement copper is introduced into the copper solutions obtained in the chlorinated roasting of burnt pyrites. A cement copper-cuprous chloride mixture separates which contains as impurities iron, lead, zinc, cobalt, manganese, arsenic and others. This cement copper-cuprous chloride mixture is mixed with a sodium chloride solution containing about 200 grams of common salt per liter while stirring in a vat provided with a stirrer at about 70° C. whereby simultaneously air is blown through the solution. Thereby the iron and arsenic are converted into insoluble compounds. The solution is separated after a short time from the residue by filtration and repumped into a vessel provided with a stirrer over nozzles for 3 to 4 hours. The cupric oxychloride forming is separated from the cupric chloride solution formed, first washed with a hot sodium chloride solution containing about 100 grams of NaCl per liter and then with hot water. The product is very pure, it contains practically no iron and only traces of silver. All other metals are only slightly detectable.

Example 2

1 ton of cuprous chloride which has been obtained from the lye of the chlorinated roasting and which contains besides large quantities of cement copper iron, arsenic, silver, lead and zinc in elementary form or in the form of their salts, is treated with about 10 cu. m. of a sodium sulfate containing common salt solution (200 grams of common salt per liter) at 50° C. whereby temporarily air is blown through the suspension for precipitating the iron and arsenic compounds. After separation of the solid material from the solution formed the solution is pumped over nozzles for the oxidation with air at 50–60° C. After three hours the separated cupric oxychloride is separated from the residual solution and the latter again added to the starting material (cuprous chloride-cement copper mixture). The cupric oxychloride is first washed with sodium chloride solution, then with water. After regeneration of the cupric chloride of the residual solution by excess cement copper and again dissolving of cuprous chloride the solution is filtered, oxidized etc. In this manner a high grade cupric oxychloride is obtained from strongly contaminated starting material.

Example 3

To a solution of the copper electrolysis containing about 60 grams of Cu per liter, 120–130 grams of NaCl per liter are added. Cement copper is added thereto and the cement copper-cuprous chloride mixture separating is worked up to cupric oxychloride as indicated in Example 1.

Example 4

By treatment of pieces of roasted pyrites with diluted sulfuric acid copper sulfate solutions of about 15 grams of copper per liter and 1 to 2 grams of sulfuric acid per liter are obtained from which cuprous chloride solutions suitable for the manufacture of cupric oxychloride are prepared in the following manner: The solution is divided in two parts of the proportion 3:1. From the first part of the solution cement copper is prepared by cementation with iron. To the second part of the solution so much sodium chloride is added that the proportion of copper ions to chlorine ions is about 1: about 15–20. This solution is mixed with the separated cement copper while stirring at about 70° C. with the simultaneous passing through of air for removing the iron and arsenic impurities. After some time the residue is separated from the cuprous chloride solution which besides cuprous chloride contains sodium sulfate and sodium chloride. This solution can directly be used for the oxidation with air. It is worked up in the above described manner to cupric oxychloride by oxidation with air.

Example 5

The process is carried out as indicated in Example 4 with the exception that to the second part of the solution so much sodium chloride is added that the proportion of copper ions to chlorine ions is 1:2. By the addition of cement copper the cuprous chloride-cement copper mixture is removed from this solution and the solution formed separated from the residue. The residue is mixed with sodium chloride solutions containing about 200 grams of NaCl pr liter while stirring and simultaneously passing through air for removing the iron and arsenic impurities. The cuprous chloride solution formed is separated from the residue and worked up to cupric oxychloride in the manner described above.

Example 6

The process is carried out as indicated in Example 2. The cuprous chloride solution obtained is atomized for oxidation in a chamber which is filled with heated oxygen from an air liquefying apparatus. The separated cupric oxychloride is removed from the adhering solution and separated silver chloride by washing with hot sodium chloride solution and hot water. In this manner a silver free, chemically pure cupric oxychloride is obtained from strongly contaminated starting material.

Example 7

1.2 tons of impure cuprous chloride containing much iron, arsenic and lead are dissolved in 10 cu. m. of a sodium sulfate containing sodium chloride solution (175 grams of NaCl and 20 grams of $Na_2SO_4$ per liter) at 70° C. The solution is separated from lead-containing undissolved parts by causing it to settle and filtering with suction. Cupric oxychloride is introduced into this solution for removing the dissolved iron, the cupric oxychloride being taken from a previous batch and excluded from further use because of mechanical contaminations. By the addition of caustic soda the solution is brought to a pH of 6–7 until all dissolved iron is separated as ferric hydroxide. Thereupon the precipitate is filtered off in filter presses and the filtered solution oxidized by repumping over nozzles in an oxygen atmosphere. The separated cupric oxychloride is filtered off and first washed with sodium chloride solution at 80° C. to be freed from lead and silver and then washed with water. The filtered solution is used for a new batch whereby the dissolved cupric chloride is reduced with cement copper to cuprous chloride.

The expression "oxygen containing gas" used in the claims is to comprise as well pure oxygen as also oxygen containing gases such as air.

This is a continuation in part of our copending application for Letters Patent Serial No. 10,584, filed March 10, 1935.

We claim:

1. Process of preparing cupric oxychloride from copper salt solutions which are contaminated by other metals including iron and arsenic which comprises precipitating the copper by the addition of cement copper in the form of cuprous chloride, separating the precipitated cuprous chloride and the excess cement copper from the solution, dissolving the cuprous chloride in an alkali metal chloride solution, treating the mixture with an oxygen containing gas, separating the precipitated iron and arsenic compounds and the excess cement copper, oxidizing the dissolved cuprous chloride to cupric oxychloride by means of any oxygen containing gas and separating the cupric oxychloride from the solution.

2. Process of preparing cupric oxychloride from copper salt solutions which are contaminated by other metals including iron, arsenic and lead which comprises precipitating the copper by the addition of cement copper in the form of cuprous chloride, separating the precipitated cuprous chloride and the excess cement copper from the solution, treating the cuprous chloride with an alkali metal chloride solution containing in addition alkali metal sulfate, treating the mixture with an oxygen containing gas, separating the solution from the solid residue containing the excess cement copper, insoluble iron and arsenic compounds and lead sulfate, oxidizing the dissolved cuprous chloride to cupric oxychloride by means of an oxygen containing gas and separating the cupric oxychloride from the solution.

3. Process of preparing cupric oxychloride from the solution obtained by lixiviating chlorinated roasted copper containing pyrites which are contaminated by other metals including iron and arsenic which comprises precipitating the copper by the addition of cement copper in the form of cuprous chloride, separating the precipitated cuprous chloride and the excess cement copper from the solution dissolving the cuprous chloride in an alkali metal chloride solution, treating the mixture with an oxygen containing gas, separating the precipitated iron and arsenic compounds and the excess cement copper, oxidizing the dissolved cuprous chloride to cupric oxychloride by means of an oxygen containing gas and separating the cupric oxychloride from the solution.

4. Process of preparing cupric oxychloride from the solutions obtained by lixiviating chlorinated roasted copper containing pyrites which are contaminated by other metals including iron, arsenic and lead which comprises precipitating the copper by the addition of cement copper in the form of cuprous chloride, separating the precipitated cuprous chloride and the excess cement copper from the solution, treating the cuprous chloride with an alkali metal chloride solution containing in addition alkali metal sulfate, treating the mixture with an oxygen containing gas, separating the solution from the solid residue containing the excess cement copper, lead sulfate and precipitated iron and arsenic compounds, oxidizing the dissolved cuprous chloride to cupric oxychloride by means of an oxygen containing gas and separating the cupric oxychloride from the solution.

ERNST KUSS.
KURT HORALEK.
OSKAR EMERT.